(12) United States Patent
Li et al.

(10) Patent No.: US 11,192,816 B2
(45) Date of Patent: Dec. 7, 2021

(54) GLASS PRODUCTION APPARATUS AND METHOD FOR MANUFACTURING GLASS

(71) Applicant: Shenzhen Jingjiang Yunchuang Technology Co., Ltd., Shenzhen (CN)

(72) Inventors: Jun-Qi Li, Shenzhen (CN); Qing Liu, Shenzhen (CN); Xiao-Bo Yuan, Shenzhen (CN); Li-Feng Zhan, Shenzhen (CN); Ya-Li Sun, Shenzhen (CN); Shang-Ming Huang, Shenzhen (CN); Kun-Lin Zou, Huizhou (CN); Xiao-Gen Li, Huizhou (CN); Man Wang, Huizhou (CN)

(73) Assignee: Shenzhen Jingjiang Yunchuang Technology Co., Ltd., Shenzhen (CN)

( * ) Notice: Subject to any disclaimer, the term of this patent is extended or adjusted under 35 U.S.C. 154(b) by 369 days.

(21) Appl. No.: 16/234,903

(22) Filed: Dec. 28, 2018

(65) Prior Publication Data
US 2020/0115267 A1 Apr. 16, 2020

(30) Foreign Application Priority Data
Oct. 15, 2018 (CN) .......................... 201811198538.2

(51) Int. Cl.
*C03B 32/02* (2006.01)
*C03B 13/04* (2006.01)
(Continued)

(52) U.S. Cl.
CPC .............. *C03B 32/02* (2013.01); *C03B 13/04* (2013.01); *C03B 23/0302* (2013.01);
(Continued)

(58) Field of Classification Search
CPC ... C03B 13/02; C03B 23/0302; C03B 17/061; C03B 17/068
See application file for complete search history.

(56) References Cited

U.S. PATENT DOCUMENTS

| 2004/0107731 A1* | 6/2004 | Doehring ................ C03B 40/00 65/81 |
| 2005/0016214 A1* | 1/2005 | Hsu ..................... C03B 33/0235 65/33.9 |

(Continued)

FOREIGN PATENT DOCUMENTS

| CN | 101851066 A | 10/2010 |
| CN | 103232152 A | 8/2013 |

(Continued)

*Primary Examiner* — Cynthia Szewczyk
(74) *Attorney, Agent, or Firm* — ScienBiziP, P.C.

(57) ABSTRACT

A glass production apparatus producing continuously curved glass for covers and containers includes a crucible, a calender device, a cutting device, a molding device, and a crystallizing device. The crucible melts glass raw material and outputs a glass melt to calender device. The calender device rolls and presses the glass melt to prepare a glass belt with a preset temperature. The cutting device cuts the glass belt with the preset temperature into glass members. The molding device include at least one molding mold and a manipulator. Each of the at least one molding mold curves at least one portion of the glass member with the preset temperature to prepare a curved glass member. The manipulator transfers the curved glass member to the crystallizing device, the crystallizing device crystallizes the curved glass member to prepare a curved crystalline glass member. A method for manufacturing such glass is also provided.

7 Claims, 5 Drawing Sheets

(51) Int. Cl.
  *C03B 23/03*    (2006.01)
  *C03B 23/035*   (2006.01)
  *C03C 10/00*    (2006.01)

(52) U.S. Cl.
  CPC ...... *C03B 23/0357* (2013.01); *C03C 10/0045* (2013.01); *C03C 2204/00* (2013.01)

(56) References Cited

U.S. PATENT DOCUMENTS

| | | | |
|---|---|---|---|
| 2006/0059949 A1* | 3/2006 | Fujimoto | C03B 11/02 65/32.5 |
| 2019/0169061 A1* | 6/2019 | Jones | H05K 5/0017 |

FOREIGN PATENT DOCUMENTS

| | | |
|---|---|---|
| GB | 1027903 A | 4/1966 |
| TW | 201247573 A | 12/2012 |

* cited by examiner

GLASS PRODUCTION APPARATUS AND METHOD FOR MANUFACTURING GLASS

FIELD

The subject matter herein generally relates to glass production.

BACKGROUND

Crystalline glass, also known as glass-ceramic, has properties such as low expansion, high temperature resistance, thermal shock resistance, and high transparency. Glass-ceramic is used in devices for Computing, Communications, and Consumer Electronics (3C products), astronomical telescopes, tableware, high temperature resistance windows, and so on.

Currently, a glass used in 3C products generally requires a small size and thinness. Conventional crystalline glass products are produced as large glass plates or large blocks or bricks of glass. When the crystalline glass products are applied to 3C products, the glass-ceramic products may need to be cut into small pieces, and then the small pieces are thermoformed to prepare curved glass.

BRIEF DESCRIPTION OF THE DRAWINGS

Implementations of the present technology will now be described, by way of embodiments, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to illustrate details and features of the present disclosure better.

The disclosure is illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one."

Several definitions that apply throughout this disclosure will now be presented.

Figure 1:
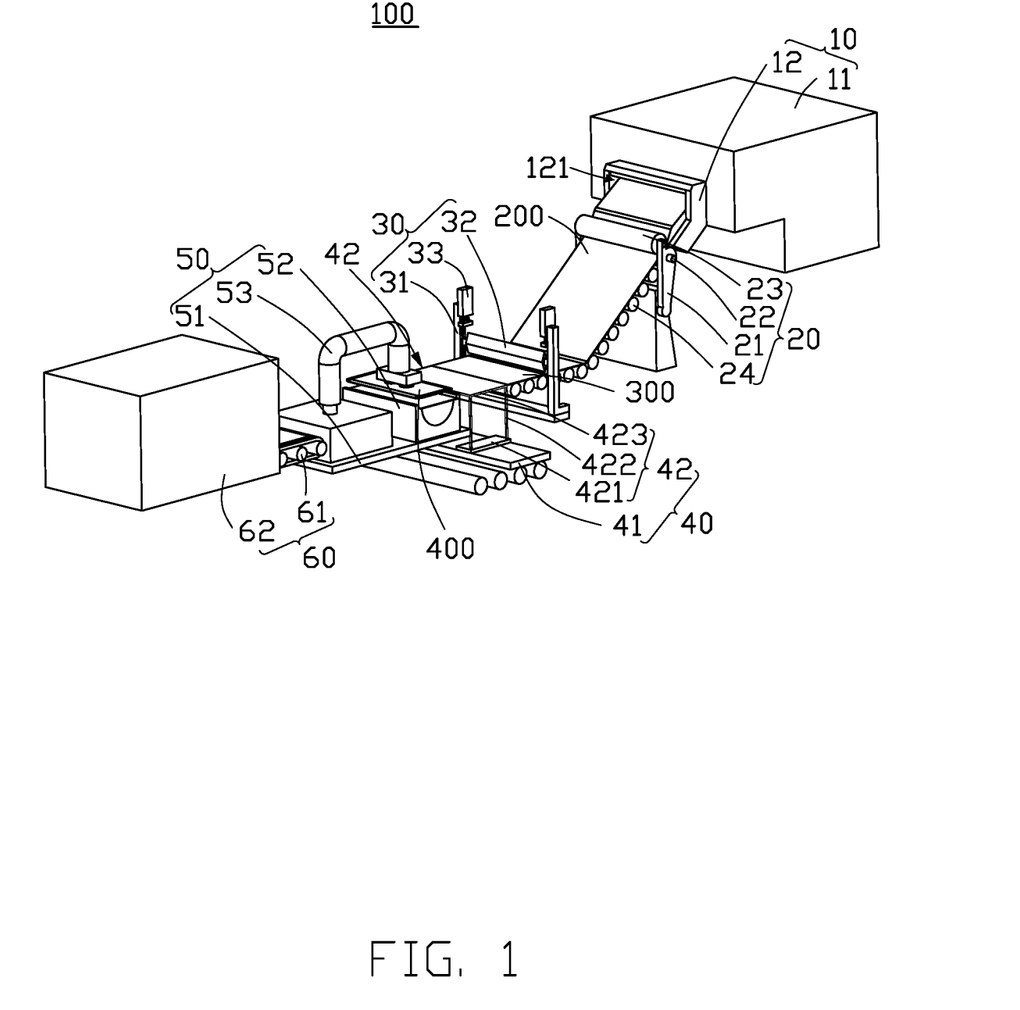
FIG. 1 is an isometric view of a glass production apparatus.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like FIG. 1 illustrates a glass production apparatus 100 configured to continuously prepare a curved crystalline glass member. The glass production apparatus 100 can include a melting device 10, a calender device 20, a cutting device 30, a transferring device 40, a molding device 50, and a crystallizing device 60. The melting device 10 can be configured to melt a glass raw material to prepare a glass melt (not shown) and drain the glass melt to the calender device 20. The calender device 20 can be configured to roll the glass melt to prepare a glass belt 200. The cutting device 30 can be configured to cut the glass belt 200 into a plurality of glass members 300. The transferring device 40 can be configured to transfer the glass member 300 to the molding device 50. The molding device 50 can be configured to mold the glass member 300 to prepare a curved glass member 400 (shown in FIG. 2) and transfer the curved glass member 400 to the crystallizing device 60. The crystallizing device 60 can be configured to crystallize the curved glass member 400 to prepare a curved crystalline glass member (not shown). The curved crystalline glass member prepared by the glass production apparatus 100 of this disclosure can be used as a protective glass of a mobile phone, a front and a rear cover plate, a protective glass of a watch, for instrument panel protection, a protective glass of a wearable device, or other purposes.

In the embodiment, the glass raw material can consist of a silicon dioxide having a mass fraction of 50%-60%, an aluminum oxide having a mass fraction of 10%-20%, a magnesium oxide having a mass fraction of 5%-10%, and a titanium dioxide having a mass fraction of 2%-10%, an antimony trioxide having a mass fraction 0-2%, and an additive having a mass fraction of 5%-15%. The titanium dioxide acts as a nucleating agent to increase a crystallinity of the curved crystalline glass member. The antimony trioxide acts as a clarifying agent to increase the clarity of the glass melt. The additive can be selected from one or other of sodium fluoride and magnesium fluoride. The additive can be used to improve a thermal stability of the curved crystalline glass member.

The melting device 10 has functions of heating, stirring, and clarification by filtering, and is capable of melting the glass raw material at a temperature of about 1300 to about 1600 degrees Celsius to prepare a clear glass melt.

In the embodiment, the melting device 10 includes a melting furnace 11 and a drainage member 12. The melting furnace 11 can be configured to melt the glass raw material to prepare a viscous liquid glass melt (not shown).

In the embodiment, the melting furnace 11 can be further include a stirring mechanism (not shown) configured to stir the glass melt in melting furnace 11 to remove air bubbles in the glass melt.

In the present embodiment, the melting furnace 11 can further include a filtering mechanism (not shown) configured to filter the glass melt in melting furnace 11 to remove impurities in the glass melt.

The drainage member 12 can be positioned on the melting furnace 11 and adjacent to a bottom of the melting furnace 11 (not shown). The drainage member 12 can communicate with the melting furnace 11 to drain the glass melt in the melting furnace 11 to the calender device 20.

In the embodiment, an opening 121 of the drainage member 12 can be configured to guide the viscous liquid glass melt to the calender device 20 to conveniently press the glass melt by the calender device 20.

The calender device 20 can include a bracket 21, a first roller 22, a second roller 23, and a transferring roller table 24. The bracket 21 can be adjacent to the melting furnace 11 of the melting device 10. The first roller 22 and the second roller 23 can be rotatably positioned on the bracket 21 and be parallel to each other. A predetermined gap can be formed between the first roller 22 and the second roller 23. The first roller 22 and the second roller 23 can be rotated by a driving member to roll the glass melt to prepare a glass belt 200 having a predetermined thickness. The transferring roller table 24 can be located between the first roller 22 and the cutting device 30. The transferring roller table 24 can be configured to cool the glass belt 200 to the preset temperature and transfer the glass belt 200 to the cutting device 30.

In the embodiment, cooling liquid (not shown) can circulate in an interior of the first roller 22 and an interior of the second roller 23 to cool the glass melt flowing between the first roller 22 and the second roller 23 to plasticize the glass belt 200.

In the embodiment, the transferring roller table 24 can further include a cooling and temperature controlling mechanism (not shown). The cooling and temperature controlling mechanism can be configured to cool and hold the glass belt 200 located on the transferring roller table 24 to a preset temperature. A range of the preset temperature can be from 700 to 850 degrees Celsius.

The cutting device 30 can include a fastening bracket 31, a cutter 32, and a driving member 33. The fastening bracket 31 can be substantially U-shaped. The cutter 32 can be slidably positioned on the fastening bracket 31 and can extend across the transferring roller table 24. The cutter 32 can be configured to cut the glass belt 200 on the transferring roller table 24 to produce glass members 300 having a preset temperature. The driving member 33 can connect to the cutter 32 to lift the cutter 32. In the embodiment, the cutter 32 can be made of a diamond material.

The transferring device 40 includes a sliding table 41 and two transferring assemblies 42. The sliding table 41 can be adjacent to the transferring roller table 24. The two transferring assemblies 42 can be spaced from each other on the sliding table 41. The sliding table 41 can move the two transferring assemblies 42. Each transfer assembly 42 can include a moving member 421, at least one lifting member 422, and a bearing frame 423. The moving member 421 can be disposed on the sliding table 41. The moving members 421 of the two transferring assemblies 42 can be close or distant. Each lifting member 422 can be positioned on the moving member 421. The bearing frame 423 can be positioned on one end of each lifting member 422 away from the moving member 421. Each lifting member 422 can lift the bearing frame 423. The bearing frame 423 can be configured to support the glass member 300. The bearing frame 423 allows the two transferring assemblies 42 to be brought closer together or separated by the moving members 421 to support the glass member 300 transferred by the transferring roller table 24 or can transfer the glass member 300 to the molding device 50.

In the embodiment, the transferring device 40 further includes a thermal insulation equipment (not shown) for holding the glass member 300 located on the bearing frame 423 to a preset temperature. A range of the above temperature range is from 700 to 850 degrees Celsius.

The molding device 50 can include a supporting table 51, at least one molding mold 52, and a manipulator 53. The table 51 can be adjacent to the sliding table 41 of the transferring device 40. At least one molding mold 52 can be positioned on the supporting table 51. Each molding mold 52 can be configured to shape the glass member 300 to prepare a curved glass member 400. The manipulator 53 can be positioned on the table 51.

Figure 2:
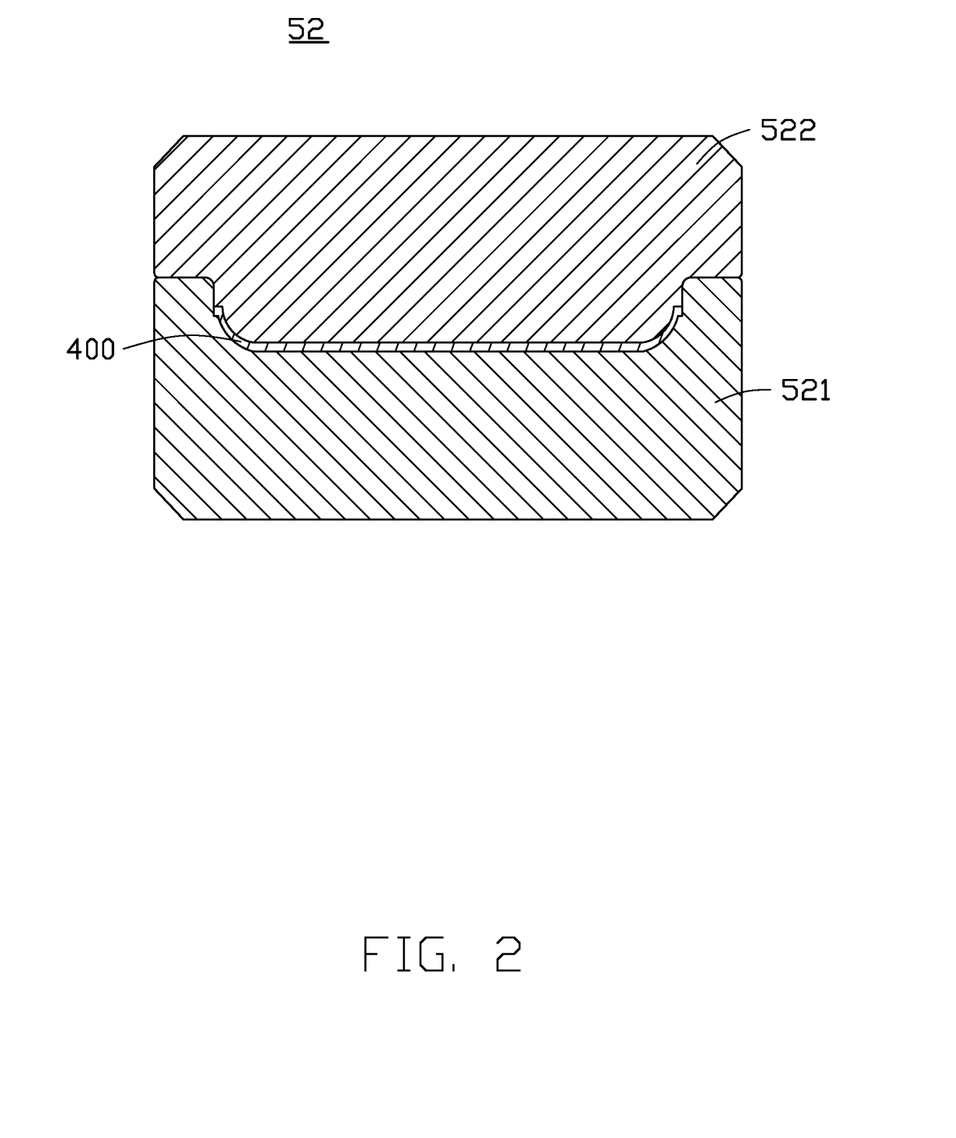
FIG. 2 is a cross-sectional view of a hot pressing molding mold of the glass production apparatus in FIG. 1 and a curved glass member.
Figure 4:
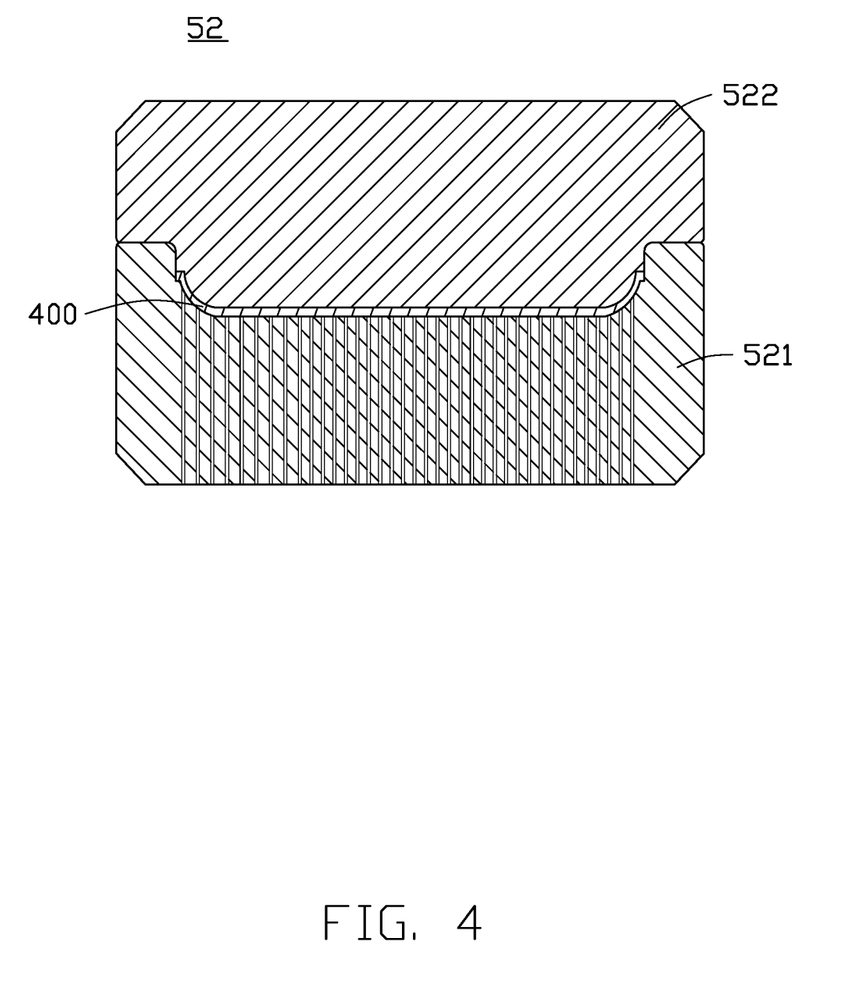
FIG. 4 is a cross-sectional view of a hot pressing and heat absorbing composite molding mold in a third embodiment of the present invention and a curved glass member.

In the embodiment, referring to FIG. 2 and FIG. 4, each molding mold 52 can be a hot press molding mold or a hot pressing and heat absorbing composite molding mold. Each molding mold 52 can include a female mold 521 and a male mold 522 engaged with the female mold 521. The manipulator 53 can be configured to separate the male mold 522 from the female mold 521 or to engage the male mold 522 to the female mold 521 to open or close the molding mold 52.

The male mold 522 of each molding mold 52 acting as the hot press molding mold can be made of graphite or platinized cemented carbide. The male mold 522 can prepare the curved glass member 400 by applying strong pressure to the glass member 300 received in the female mold 521.

The female mold 521 of each molding mold 52 acting as a hot pressing and heat absorbing composite molding mold can be made of graphite or a porous ceramic material. The female mold 521 can connect to a vacuum generator (not shown). The male mold 522 can press the glass member 300 received in the female mold 521, the glass member 300 being vacuum-adsorbed by the female mold 521.

Figure 3:
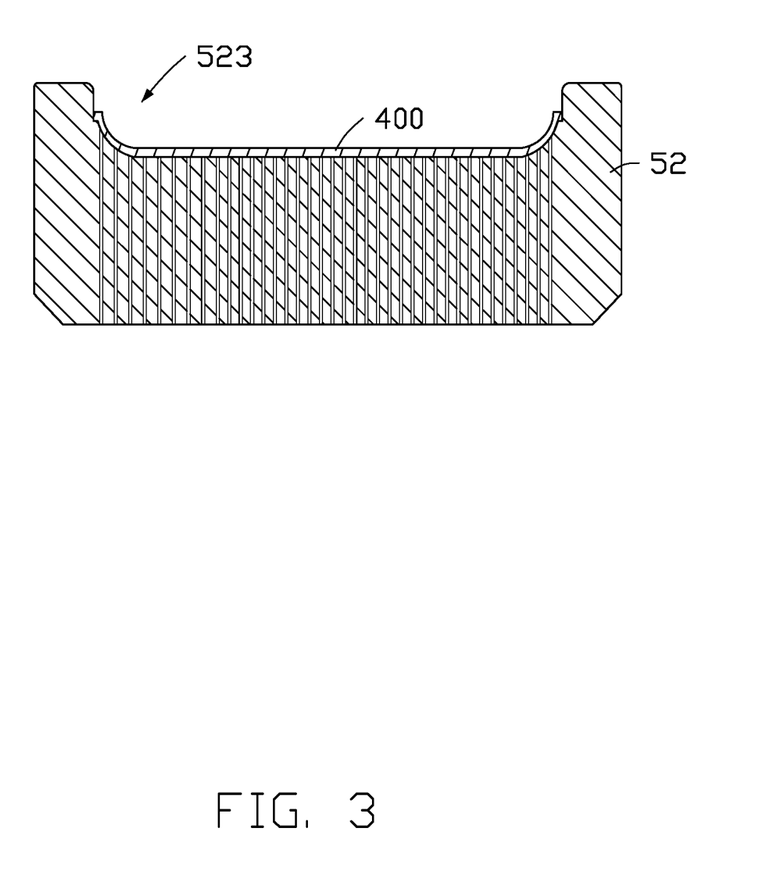
FIG. 3 is a cross-sectional view of a heat absorbing molding mold in a second embodiment of the present invention and a curved glass member.

In at least one embodiment, referring to FIG. 3, each molding mold 52 can also be a heat absorbing molding mold. Each molding mold 52 can be made of graphite or porous ceramic material. A molding cavity 523 can be defined in the molding mold 52 to receive the glass member 300. Each molding mold 52 can connect to a vacuum generator (not shown). Each molding mold 52 can adsorb the glass member 300 to prepare the curved glass member 400.

It can be understood that the at least one molding mold 52 can be at least one of the hot press molding mold, the heat absorbing molding mold, and the hot pressing and heat absorbing composite molding mold.

The manipulator 53 can be also configured to vacuum-lift the curved glass member 400 received in the molding mold 52 and release the curved glass member 400 to the crystallizing device 60.

In the embodiment, the molding device 50 can further include a temperature controlling mechanism, a gas protection mechanism, and a controller (not shown). The temperature controlling mechanism can be configured to preheat each molding mold 52 to a preset temperature of 700 to 850 degrees Celsius. The gas protection mechanism can be configured to protect each molding mold 52 during molding process and cooling process in a protective atmosphere. The controller can be configured to control the temperature controlling mechanism and the gas protection mechanism.

The crystallization apparatus 60 can include a transferring mechanism 61 and a crystallizing furnace 62. The transferring mechanism 61 can be configured to transfer the curved glass member 400 into the crystallizing furnace 62. The crystallizing furnace 62 can be configured to crystallize the curved glass member 400 to prepare a curved crystalline glass member (not shown).

Figure 5:
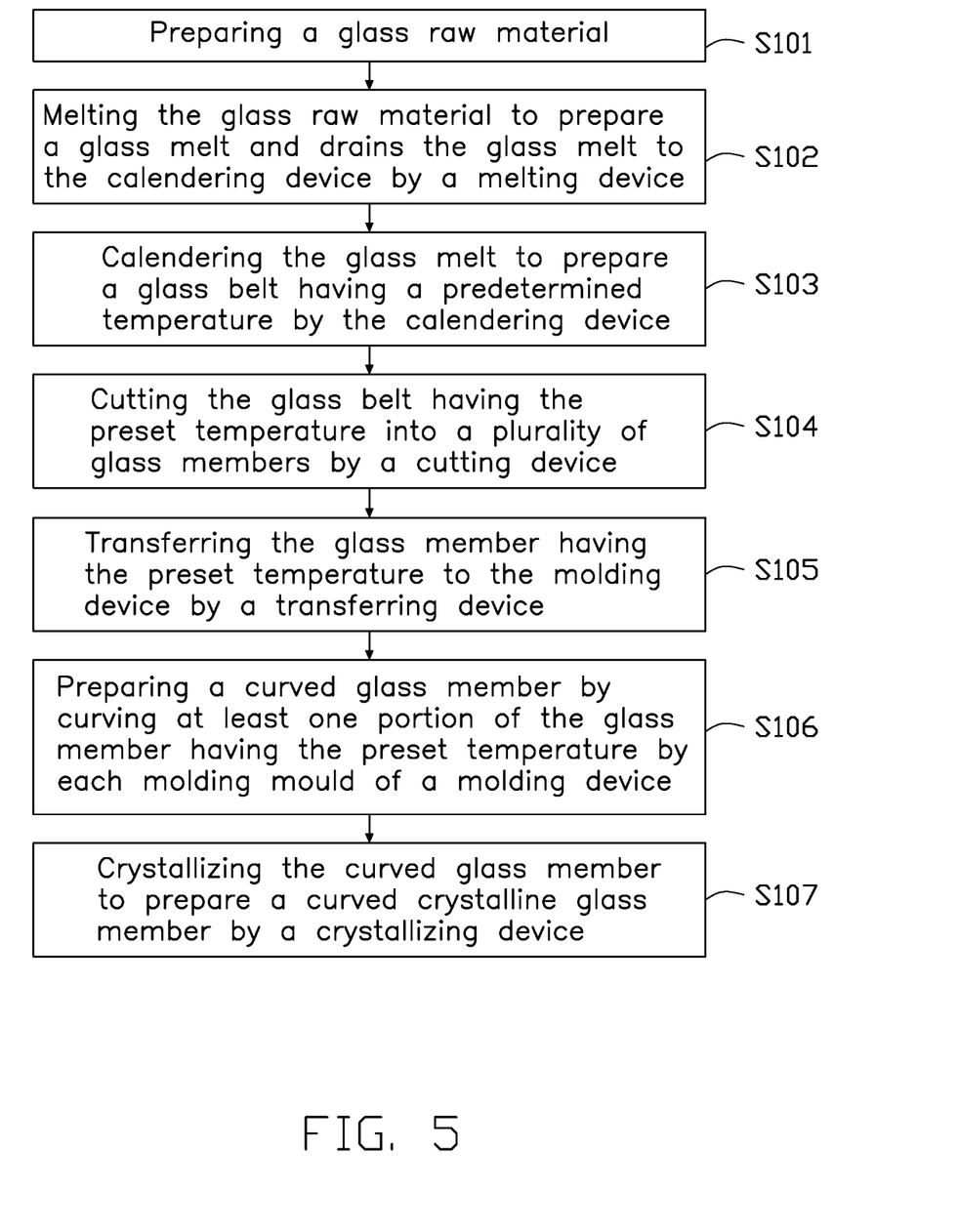
FIG. 5 is a flowchart of an embodiment of a glass manufacturing method of the glass production apparatus.

FIG. 5 shows a flowchart of a glass manufacturing method of the glass production apparatus to continuously prepare a curved crystalline glass member (not shown), which will be further described below in conjunction with specific embodiments.

Referring to FIG. 1 to FIG. 5, the glass manufacturing method in a first embodiment can include the following processes.

S101: a glass raw material is prepared.

Specifically, the silicon dioxide having a mass fraction of 50%, the aluminum oxide having a mass fraction of 20%, the magnesium oxide having a mass fraction of 10%, the titanium oxide having a mass fraction of 10%, the trioxide having a mass fraction of 1%, and the additive having a mass fraction of 9% can be mixed to prepare a glass raw material.

S102, the melting device 10 melts the glass raw material to prepare a glass melt and drains the glass melt to the calender device 20.

Specifically, the glass raw material is placed into the melting furnace 11 of the melting device 10 and is subjected to high-temperature melting treatment by a heating member. The stirring mechanism stirs the glass melt in the melting furnace 11, and the filtering mechanism filters the glass melt in the crucible to during a high-temperature melting process. A temperature of the high-temperature melting treatment is about 1300 degrees. The drainage member 12 drains the glass melt to the calender device 20.

S103: The calender device 20 continuously rolls and presses the glass melt to prepare a glass belt 200 having a preset temperature.

Specifically, the first roller 22 and the second roller 23 of the calender device 20 rotate and so press the glass melt drawn by the drainage member 12 into a glass belt 200 having a predetermined thickness. The glass belt 200 is transferred to the transferring roller table 24 of the calender device 20. Simultaneously, the temperature controlling mechanism (not shown) of the calender device 20 heats the glass belt 200 on the transferring roller table 24 to a preset temperature of about 700 degrees.

S104: the cutting device 30 cuts the glass belt 200 having the preset temperature into a plurality of glass members 300.

Specifically, the cutter 32 of the cutting device 30 cuts the glass belt 200 on the transferring roller table 24 into a plurality of glass members 300.

S105: the transferring device 40 transfers the glass member 300 having the preset temperature to the molding device 50.

Specifically, the sliding table 41 of the transferring device 40 drives the two transfer assemblies 42 close to the transferring roller table 24. The transferring roller table 24 transports the glass member 300 to the bearing frame 423 of the two transfer assemblies 42. The sliding table 41 drives the bearing frame 423 close to a molding mold 52 and places the glass member 300 above the molding mold 52. Each lifting member 422 drives a bearing frame 423 close to the molding mold 52. Each moving member 421 of the two transfer assemblies 42 moves the bearing frames 423 of the two transfer assemblies 42 away from each other to place the glass member 300 in the molding mold 52. Simultaneously, the temperature controlling mechanism of the transferring device 40 heats the glass member 300 on the bearing frame 423 to a preset temperature of 700 degrees.

S106: each molding mold 52 of the molding device 50 prepares the curved glass member 400 by curving at least one portion of the glass member (300) having the preset temperature.

Specifically, the gas protection mechanism of the molding device 50 protects each molding mold 52 acting as the hot press molding mold during molding process and cooling process in a protective atmosphere. The manipulator 53 places the male mold 522 on a female mold 521. The male mold 522 of each molding mold 52 is held for 10 minutes at 0.3 of standard atmospheric pressure to curve at least one portion of the glass member 300. Then each molding mold 52 cools to room temperature. Finally, the manipulator 53 separates the male mold 522 from the female mold 521 to prepare the curved glass member 400.

It can be understood that the gas protection mechanism of the molding device 50 protects each molding mold 52 acting as heat absorbing molding mold during molding process and cooling process in a protective atmosphere. Each molding mold 52 is held for 15 minutes at one standard atmospheric pressure by vacuum generator. Then each molding mold 52 cools to room temperature to prepare the curved glass member 400 by curving at least one portion of the glass member 300.

It can be understood that the gas protection mechanism of the molding device 50 protects each molding mold 52 acting as the hot pressing and heat absorbing composite molding mold during molding process and cooling process in a protective atmosphere. The manipulator 53 places the male mold 522 on a female mold 521. The male mold 522 of each molding mold 52 is held for 10 minutes at 0.2 of standard atmospheric pressure. Simultaneously, the female mold 521 of each molding mold 52 is evacuated by the vacuum generator (not shown) at one standard atmospheric pressure and held for 10 minutes to curve at least one portion of the glass member 300. Then each molding mold 52 cools to room temperature. Finally, the manipulator 53 separates the male mold 522 from the female mold 521 to prepare the curved glass member 400.

S107: the crystallizing device 60 crystallizes the curved glass member 400 to prepare a curved crystalline glass member (not shown).

Specifically, the manipulator 53 of the molding device 50 vacuum-lifts the curved glass member 400 received in the molding mold 52 and releases the curved glass member 400 to the conveying mechanism 61 of the crystallizing device 60. The transferring mechanism 61 of the crystallizing device 60 transfers the curved glass member 400 into the crystallizing furnace 62 of the crystallizing device 60. The crystallizing furnace 62 performs crystallization heating treatment on the curved glass member 400. The crystallization heating treatment employs a temperature-step controlling system. The temperature-step controlling system is that, in the first stage, the crystallizing furnace 62 is heated to 680 degrees at a rate of 10 degrees/min, and held for 2 hours. In the second stage, the crystallizing furnace 62 is further heated to 800 degrees at a rate of 10 degrees/min and held for 4 hours. Finally, the crystallizing furnace 62 is cooled to room temperature to prepare a curved crystalline glass member (not shown).

The glass manufacturing method in a second embodiment can include the following processes.

S201: a glass raw material is prepared.

Specifically, the silicon dioxide having a mass fraction of 55%, the aluminum oxide having a mass fraction of 15%, the magnesium oxide having a mass fraction of 5%, the titanium oxide having a mass fraction of 8%, the trioxide having a mass fraction of 2%, and the additive having a mass fraction of 15% can be mixed to prepare a glass raw material.

S202: the melting device 10 melts the glass raw material to prepare a glass melt and drains the glass melt to the calender device 20.

Specifically, the glass raw material is placed into the melting furnace 11 of the melting device 10 and is subjected to high-temperature melting treatment by a heating member. The stirring mechanism stirs the glass melt in the melting furnace 11, and the filtering mechanism filters the glass melt in the crucible to during a high-temperature melting process. A temperature of the high-temperature melting treatment is about 1500 degrees. The drainage member 12 outputs the glass melt to the calender device 20.

S203: The calender device 20 continuously press the glass melt to prepare a glass belt 200 having a preset temperature.

Specifically, the first roller 22 and the second roller 23 of the calender device 20 rotate and press the glass melt drawn by the drainage member 12 into a glass belt 200 having a predetermined thickness. The glass belt 200 is transferred to the transferring roller table 24 of the calender device 20. Simultaneously, the temperature controlling mechanism (not shown) of the calender device 20 heats the glass belt 200 on the transferring roller table 24 to a preset temperature of about 750 degrees.

S204: the cutting device 30 cuts the glass belt 200 having the preset temperature into a plurality of glass members 300.

Specifically, the cutter 32 of the cutting device 30 cuts the glass belt 200 on the transferring roller table 24 into a plurality of glass members 300.

S205: the transferring device 40 transfers the glass member 300 having the preset temperature to the molding device 50.

Specifically, the sliding table 41 of the transferring device 40 drives the two transfer assemblies 42 close to the transferring roller table 24. The transferring roller table 24 transports the glass member 300 to the bearing frame 423 of the two transfer assemblies 42. The sliding table 41 drives the bearing frame 423 close to a molding mold 52 and places the glass member 300 above the molding mold 52. Each lifting member 422 drives a bearing frame 423 close to the molding mold 52. Each moving member 421 of the two transfer assemblies 42 moves the bearing frames 423 away from each other to place the glass member 300 in the molding mold 52. Simultaneously, the temperature controlling mechanism of the transferring device 40 heats the glass member 300 on the bearing frame 423 to a preset temperature of 750 degrees.

S206: each molding mold 52 of the molding device 50 prepares the curved glass member 400 by curving the glass member 300 having the preset temperature.

Specifically, the gas protection mechanism of the molding device 50 protects each molding mold 52 acting as the hot press molding mold during molding process and cooling process in a protective atmosphere. The manipulator 53 places the male mold 522 on a female mold 521. The male mold 522 of each molding mold 52 is held for 15 minutes at 0.5 of standard atmospheric pressure to curve at least one portion of the glass member 300. Then each molding mold 52 cools to room temperature. Finally, the manipulator 53 separates the male mold 522 from the female mold 521 to prepare the curved glass member 400.

It can be understood that the gas protection mechanism of the molding device 50 protects each molding mold 52 acting as heat absorbing molding mold during molding process and cooling process in a protective atmosphere. Each molding mold 52 is held for 20 minutes at 1.5 of standard atmospheric pressure by the vacuum generator (not shown). Then each molding mold 52 cools to room temperature to prepare the curved glass member 400 by curving at least one portion of the glass member 300.

It can be understood that the gas protection mechanism of the molding device 50 protects each molding mold 52 acting as the hot pressing and heat absorbing composite molding mold during molding process and cooling process in a protective atmosphere. The manipulator 53 places the male mold 522 on a female mold 521. The male mold 522 of each molding mold 52 is held for 15 minutes at 0.4 of standard atmospheric pressure. Simultaneously, the female mold 521 of each molding mold 52 is evacuated by the vacuum generator (not shown) at 1.5 of standard atmospheric pressure and held for 15 minutes to curve at least one portion of the glass member 300. Then each molding mold 52 cools to room temperature. Finally, the manipulator 53 separates the male mold 522 from the female mold 521 to prepare the curved glass member 400.

S207: the crystallizing device 60 crystallizes the curved glass member 400 to prepare a curved crystalline glass member (not shown).

Specifically, the manipulator 53 of the molding device 50 vacuum-lifts the curved glass member 400 received in the molding mold 52 and releases the curved glass member 400 to the conveying mechanism 61 of the crystallizing device 60. The transferring mechanism 61 of the crystallizing device 60 transfers the curved glass member 400 into the crystallizing furnace 62 of the crystallizing device 60. The crystallizing furnace 62 performs crystallization heating treatment on the curved glass member 400. The crystallization heating treatment employs temperature-step controlling system. The temperature controlling system is that, in the first stage, the crystallizing furnace 62 is heated to 730 degrees at a rate of 10 degrees/min, and held for 3.5 hours. In the second stage, the crystallizing furnace 62 is further heated to 850 degrees at a rate of 10 degrees/min and held for 7 hours. Finally, the crystallizing furnace 62 is cooled to room temperature to prepare a curved crystalline glass member (not shown).

The glass manufacturing method in a third embodiment can include the following processes.

S301: a glass raw material is prepared.

Specifically, the silicon dioxide having a mass fraction of 60%, the aluminum oxide having a mass fraction of 10%, the magnesium oxide having a mass fraction of 10%, the titanium oxide having a mass fraction of 10%, the trioxide having a mass fraction of 10%, and the additive having a mass fraction of 10% can be mixed to prepare a glass raw material.

S302: the melting device 10 melts the glass raw material to prepare a glass melt and drains the glass melt to the calender device 20.

Specifically, the glass raw material is placed into the melting furnace 11 of the melting device 10 and is subjected to high-temperature melting treatment by a heating member. The stirring mechanism stir the glass melt in the melting furnace 11, and the filtering mechanism filters the glass melt in the crucible to during a high-temperature melting process. A temperature of a high-temperature melting treatment is 1600 degrees Celsius. The drainage member 12 drains the glass melt to the calender device 20.

S303: The calender device 20 continuously rolls and presses the glass melt to prepare a glass belt 200 having a preset temperature.

Specifically, the first roller 22 and the second roller 23 of the calender device 20 rotate and press the glass melt drawn by the drainage member 12 into a glass belt 200 having a predetermined thickness. The glass belt 200 is transferred to the transferring roller table 24 of the calender device 20. Simultaneously, the temperature controlling mechanism (not shown) of the calender device 20 heats the glass belt 200 on the transferring roller table 24 to a preset temperature of 850 degrees.

S304: the cutting device 30 cuts the glass belt 200 having the preset temperature into a plurality of glass members 300.

Specifically, the cutter 32 of the cutting device 30 cuts the glass belt 200 on the transferring roller table 24 into a plurality of glass members 300.

S305: the transferring device 40 transfers the glass member 300 having the preset temperature to the molding device 50.

Specifically, the sliding table 41 of the transferring device 40 drives the two transfer assemblies 42 close to the transferring roller table 24. The transferring roller table 24 transports the glass member 300 to the bearing frame 423 of the two transfer assemblies 42. The sliding table 41 drives the bearing frame 423 close to a molding mold 52 and places the glass member 300 above the molding mold 52. Each lifting member 422 drives a bearing frame 423 close to the molding mold 52. Each moving member 421 of the two transfer assemblies 42 moves the bearing frames 423 of the two transfer assemblies 42 away from each other to place the glass member 300 in the molding mold 52. Simultaneously, the temperature controlling mechanism of the transferring device 40 heats the glass member 300 on the bearing frame 423 to a preset temperature of 850 degrees.

S306: each molding mold 52 of the molding device 50 prepares the curved glass member 400 by curving the glass member 300 having the preset temperature.

Specifically, the gas protection mechanism of the molding device 50 protects each molding mold 52 acting as the hot press molding mold during molding process and cooling process in a protective atmosphere. The manipulator 53 places the male mold 522 on a female mold 521. The male mold 522 of each molding mold 52 is held for 20 minutes at 0.6 of standard atmospheric pressure to curve at least one portion of the glass member 300. Then each molding mold 52 cools to room temperature. Finally, the manipulator 53 separates the male mold 522 from the female mold 521 to prepare the curved glass member 400.

It can be understood that the gas protection mechanism of the molding device 50 protects each molding mold 52 acting as heat absorbing molding mold during molding process and cooling process in a protective atmosphere. Each molding mold 52 is held for 25 minutes at 2 of standard atmospheric pressure by the vacuum generator (not shown). Then each molding mold 52 cools to room temperature to prepare the curved glass member 400 by curving at least one portion of the glass member 300.

It can be understood that the gas protection mechanism of the molding device 50 protects each molding mold 52 acting as the hot pressing and heat absorbing composite molding mold during molding process and cooling process in a protective atmosphere. The manipulator 53 places the male mold 522 on a female mold 521. The male mold 522 of each molding mold 52 is held for 10 minutes at 0.5 of standard atmospheric pressure. Simultaneously, the female mold 521 of each molding mold 52 is evacuated by the vacuum generator (not shown) at 2 times standard atmospheric pressure and held for 10 minutes to curve at least one portion of the glass member 300. Then each molding mold 52 cools to room temperature. Finally, the manipulator 53 separates the male mold 522 from the female mold 521 to prepare the curved glass member 400.

S307: the crystallizing device 60 crystallizes the curved glass member 400 to prepare a curved crystalline glass member (not shown).

Specifically, the manipulator 53 of the molding device 50 vacuum-lifts the curved glass member 400 received in the molding mold 52 and releases the curved glass member 400 to the conveying mechanism 61 of the crystallizing device 60. The transferring mechanism 61 of the crystallizing device 60 transfers the curved glass member 400 into the crystallizing furnace 62 of the crystallizing device 60. The crystallizing furnace 62 performs crystallization heating treatment on the curved glass member 400. The crystallization heating treatment employs temperature controlling system. The temperature controlling system is as that, in the first stage, the crystallizing furnace 62 is heated to 780 degrees at a rate of 10 degrees/min, and held for 5 hours. In the second stage, the crystallizing furnace 62 is further heated to 900 degrees at a rate of 10 degrees/min and held for 10 hours. Finally, the crystallizing furnace 62 is cooled to room temperature to prepare a curved crystalline glass member (not shown).

It can be understood that S105, the S205, and the S305 can be removed without affecting crystallizing of the curved glass member 400 by the crystallizing device 60.

In other embodiments, the transferring device 40 can be omitted, the glass member 300 prepared by the cutting device 30 can be directly transferred to the molding device 50 by an operator.

In other embodiments, the supporting table 51 can be omitted, the molding mold 52 and the manipulator 53 can be directly positioned on a floor.

The embodiments shown and described above are only examples. Many details are often found in the art such as the other features of a glass production apparatus and a glass manufacturing method. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will, therefore, be appreciated that the embodiments described above may be modified within the scope of the claims.

What is claimed is:

1. A glass production apparatus, adapted for continuously preparing a curved crystalline glass member, the glass production apparatus comprising:
    a melting device configured to melt a glass raw material to prepare a glass melt;
    a calender device;
    a cutting device;
    a molding device comprising:
    at least one molding mold; and
    a manipulator; and
    a crystallizing device;
    wherein the melting device drains the glass melt to the calender device, the calender device rolls the glass melt to prepare a glass belt with a preset temperature, the cutting device cuts the glass belt with the preset temperature into a plurality of glass members, each of the at least one molding mold curves at least one portion of the glass member with the preset temperature to prepare a curved glass member, the manipulator transfers the curved glass member to the crystallizing device, and the crystallizing device crystallizes the curved glass member to obtain a curved crystalline glass member;

wherein the melting device comprises a melting furnace and a drainage member, the melting furnace is configured to melt the glass raw material to prepare the glass melt, the drainage member is positioned on the melting furnace, and the drainage member communicates with the melting furnace to drain the glass melt in the melting furnace to the calender device;

wherein the calender device comprises a bracket, a first roller, a second roller, and a transferring roller table, the bracket is adjacent to the melting furnace, the first roller and the second roller are rotatably positioned on the bracket and are parallel to each other, a predetermined gap is formed between the first roller and the second roller, the first roller and the second roller are rotated by a driving member to roll the glass melt to prepare the glass belt having a predetermined thickness, the transferring roller table is located between the first roller and the cutting device, and the transferring roller table is configured to cool the glass belt to the preset temperature and transfer the glass belt to the cutting device;

wherein the cutting device comprises a fastening bracket, a cutter, and a driving member, the cutter is slidably positioned on the fastening bracket and extends across the transferring roller table, the cutter is configured to cut the glass belt on the transferring roller table into the plurality of glass member having the preset temperature, and the driving member connects to the cutter to lift the cutter;

wherein the glass production apparatus further comprises a transferring device, the transferring device comprises a sliding table and two transferring assemblies, the sliding table is arranged adjacent to the transferring roller table, the two transferring assemblies are spaced from each other on the sliding table, the sliding table is capable of moving the two transferring assemblies;

each of the transfer assemblies comprises a moving member, at least one lifting member, and a bearing frame, the moving member is disposed on the sliding table, the moving members of the two transferring assemblies are capable of closing or far away from each other, each of the lifting members is positioned on the moving member, the bearing frame is positioned on one end of each of the lifting members away from the moving member, each of the lifting member is adapted for lifting the bearing frame, the bearing frame is configured to support the glass member, the bearing frame of the two transferring assemblies is configured to be brought closer together or separated each other by the moving members to support the glass member transferred by the transferring roller table or transfer the glass member to the molding device.

2. The glass production apparatus of claim 1, wherein each of the at least one molding mold is a hot press molding mold and comprises a female mold and a male mold engaged with the female mold, the male mold presses the glass member in the male mold to prepare the curved glass member, and the manipulator separates the male mold from the female mold or engages the male mold to the female mold to open or close the molding mold.

3. The glass production apparatus of claim 2, wherein the male mold is made of graphite or platinized cemented carbide.

4. The glass production apparatus of claim 1, wherein each of the at least one molding mold is a hot pressing and heat absorbing composite molding mold, each of the at least one molding mold comprises a female mold and a male mold engaged with the female mold, the female mold connects to a vacuum generator, the male mold presses the glass member in the female mold and the glass member is vacuum-adsorbed by the female mold to curve at least one portion of the glass member to prepare the curved glass member, and the manipulator separates the male mold from the female mold or engages the male mold to the female mold to open or close the molding mold.

5. The glass production apparatus of claim 4, wherein the female mold is made of graphite or a porous ceramic material.

6. The glass production apparatus of claim 1, wherein each of the at least one molding mold is a heat absorbing molding mold, each of the at least one molding mold connects to a vacuum generator, each of the at least one molding mold adsorbs the glass member to prepare the curved glass member by curving at least one portion of the glass member.

7. The glass production apparatus of claim 6, wherein each of the at least one molding mold is made of graphite or porous ceramic material.

* * * * *